US008301297B2

(12) United States Patent
Bowers et al.

(10) Patent No.: US 8,301,297 B2
(45) Date of Patent: Oct. 30, 2012

(54) SYSTEM AND METHOD FOR CONTINUOUS SORTING OPERATION IN A MULTIPLE SORTER ENVIRONMENT

(75) Inventors: Brian Bowers, Mundelein, IL (US); Michael Swift, Libertyville, IL (US)

(73) Assignee: Bell and Howell, LLC, Durham, NC (US)

( * ) Notice: Subject to any disclaimer, the term of this patent is extended or adjusted under 35 U.S.C. 154(b) by 482 days.

(21) Appl. No.: 12/716,644

(22) Filed: Mar. 3, 2010

(65) Prior Publication Data

US 2010/0228387 A1 Sep. 9, 2010

Related U.S. Application Data

(60) Provisional application No. 61/157,485, filed on Mar. 4, 2009.

(51) Int. Cl.
*G06F 7/00* (2006.01)
*G06K 9/00* (2006.01)

(52) U.S. Cl. ........ 700/226; 700/224; 700/219; 209/583; 209/584

(58) Field of Classification Search ........................ None
See application file for complete search history.

(56) References Cited

U.S. PATENT DOCUMENTS

| | | | |
|---|---|---|---|
| 3,452,509 | A | 7/1969 | Werner |
| 3,968,350 | A | 7/1976 | Watson |
| 4,034,669 | A | 7/1977 | Freeman |
| 4,239,434 | A | 12/1980 | Gannon |
| 4,756,520 | A | 7/1988 | Clark, Jr. et al. |
| 4,832,204 | A | 5/1989 | Handy et al. |
| 4,868,757 | A | 9/1989 | Gil |
| 4,910,686 | A | 3/1990 | Chang et al. |
| 4,923,022 | A | 5/1990 | Hsieh |
| 5,229,932 | A | 7/1993 | Connell et al. |
| 5,245,545 | A | 9/1993 | Taylor |
| 5,257,196 | A | 10/1993 | Sansone |
| 5,262,597 | A | 11/1993 | Johnson, Jr. |
| 5,420,403 | A | 5/1995 | Allum et al. |
| 5,673,193 | A | 9/1997 | Brust et al. |
| 5,842,186 | A | 11/1998 | Kulik |

(Continued)

FOREIGN PATENT DOCUMENTS

DE 100 37 756 C1 11/2001

(Continued)

*Primary Examiner* — Gene Crawford
*Assistant Examiner* — Yolanda Jones
(74) *Attorney, Agent, or Firm* — McDermott Will & Emery LLP

(57) ABSTRACT

The present application relates to a system and method for sorting mailpieces prior to their delivery to the postal authority. The system and method allow for the running of different first pass sort schemes on multiple sorters in a sorting facility without stopping operations for no-count mode, without losing mailpiece tracking, or waiting for all first pass sorting to complete before re-running the mail that was not sorted to the finest depth of sorting. With the present application, mailpieces that can be run a second time can be run concurrently during first pass without the high risk no-count mode or loss of data integrity.

23 Claims, 5 Drawing Sheets

U.S. PATENT DOCUMENTS

| | | | | |
|---|---|---|---|---|
| 6,098,057 | A | 8/2000 | Dlugos | |
| 6,303,889 | B1 | 10/2001 | Hayduchok et al. | |
| 6,501,041 | B1 | 12/2002 | Burns et al. | |
| 6,510,992 | B2 | 1/2003 | Wells et al. | |
| 6,539,098 | B1 | 3/2003 | Baker et al. | |
| 6,697,500 | B2 | 2/2004 | Woolston et al. | |
| 2003/0014376 | A1 | 1/2003 | DeWitt et al. | |
| 2003/0115160 | A1 | 6/2003 | Nowlin et al. | |
| 2009/0159508 | A1* | 6/2009 | Kostyniuk et al. | 209/584 |
| 2009/0294338 | A1* | 12/2009 | Lee et al. | 209/584 |

FOREIGN PATENT DOCUMENTS

| | | |
|---|---|---|
| DE | 10150464 | 4/2003 |
| EP | 1 086 754 A2 | 3/2001 |
| WO | WO 2004/020115 | 3/2004 |
| WO | WO 2004/029754 | 4/2004 |
| WO | WO 2005/014189 | 2/2005 |

* cited by examiner

SYSTEM AND METHOD FOR CONTINUOUS SORTING OPERATION IN A MULTIPLE SORTER ENVIRONMENT

RELATED APPLICATIONS

This application claims the benefit of U.S. Provisional Application No. 61/157,485 filed Mar. 4, 2009, the disclosure of which is entirely incorporated herein by reference.

TECHNICAL FIELD

The present subject matter relates to techniques and equipment to sort mailpieces prior to their delivery to the postal authority. Additional services are provided in data reporting and printing of delivery point barcodes. Performing these additional services together with sorting will qualify the mailing for postage discounts.

BACKGROUND

Many large mail sorting operations use multiple sorters to handle the quantity of mail that must be processed during the daily operations. These sorting operations can be captive shops or letter shops that manufacture the mail and then presort the mail before it is delivered to the postal authority such as the United States Postal Service (USPS®). Presort operations is another example of a large sorting operation with multiple machines. Many of these presorting operations process many different jobs from different clients or departments. In many cases, the client data and department data must be tracked by mailpiece and reported. Sorting operations are designed to sort the mailpieces into predefined groups of geographically related delivery points (addresses). The grouping relate to postal processing centers and mail carrier routes. Since the delivery point is associated with a number (e.g. ZIP Code) the groupings will be individual numbers or groups and ranges of numbers. For the USPS, the finest depth of sorting is based on the high order 5 digits of the ZIP Code. The next depth of sorting is based on the high order 3 digits and the lowest depth of sorting is also based on the high order 3 digits, but the range of 3 digit numbers is expanded to cover Automated Area Distribution Centers (AADC). Increasing postage discounts are based on the mailpiece sorting results with the largest discount for 5 digit and the least discount for AADC, provided at least 150 mailpieces are in the group and the ZIP Code was encoded in an approved barcode and printed on the mailpiece.

The sorting operator must create a sort scheme to control the sorter during first pass operations when the mailpieces are first processed. The data associated with each job and mailpiece is collected during first pass and stored for later use in generation of a report. The sort scheme determines which ZIP Codes will be sorted into which sort bins. The first pass sort scheme gives priority to high volume 5 digit groups and 5 digit schemes (ranges of 5 digit numbers that get the same discount when combined). Second priority for sort bin utilization is 3 digit groups or schemes. In numerous cases, sort bins will be assigned large ranges for 3 digit numbers. The mailpieces in these bins will be processed on a second pass, with a different sort scheme, to sort the mailpieces to additional 5 digit groups. The second pass is required because there are far more qualifying 5 digit groups than there are bins on the sorter.

Sorter operators will allocate sort bins for the first pass sort scheme to the highest volume 5 digit groups or schemes based on historical data. The operator has to leave available a sufficient number of bins for second pass mail collection and for special purposes, such as reject bins and undeliverable mail. Since a large sorter may have 100 to 260 sort bins, only a few of the thousands of 5 digit sort groups will be sorted to during first pass. This means that a significant amount of mail will have to be processed on second pass or even a third pass. These subsequent passes add significant processing time that may result in not sorting the mail to the finest depth of sort before the mail must be delivered to the postal authority. Significant extra hours of operation are required for the subsequent passes and significant postal discounts may be lost.

Since the sort groups are not known in advance of first pass sortation, all of the sorters in a given operation will run the same first pass sort scheme. Second pass can not be started until all of first pass is competed and analysis of the first pass data is made to create a second pass sort scheme(s). Having the same second pass sort bin designations on each machine also facilitates second pass operation where mail from individual second pass sort bins, with the same bin sort scheme, can be run on different machines during second pass.

A few sorter operators will have different first pass sort schemes on different sorters and use a NO-COUNT mode to run out of scheme mail from one machine on the other machine during first pass operation. In order to use NO-COUNT mode, the sorter must be stopped and the mode selected before the mail is run. Data from the first time the mail was run, on a different machine, is used for postal authority reports. NO-COUNT mode stops data collection. This mode represents high risk because if the operator does not cancel the mode as required, a large volume of mail may be processed incorrectly. In addition, individual mailpiece tracking, as required for the USPS Intelligent Mail operations, can not be accomplished in a NO-COUNT mode.

Hence, there exists a need for the ability to run different first pass sort schemes on each sorter in a sorting facility without stopping operations for NO-COUNT, without losing mailpiece tracking, or waiting for all first pass sorting to complete before re-running the mail that was not sorted to the finest depth of sorting.

SUMMARY

The teachings herein alleviate one or more of the above noted problems by allowing all sorters in a shop to have different first pass sort schemes. This process increases the number of sort bins that can be assigned to a different 5 digit sort group during first pass operations, reducing the quantity of mailpieces that have to be run during second pass. Mailpieces that can be run a second time can be run concurrently during first pass without the high risk NO-COUNT mode or loss of data integrity.

It is desirable to provide a method for performing continuous sortation of mailpieces using a plurality of sorters. The method includes assigning first and second sortation schemes to first and second sorters, respectively. The first sorter receives a first batch of mailpieces and the second sorter receives a second batch of mailpieces. At least one sortation bin on the first sorter is assigned to receive mailpieces to be further processed on the second sorter with the second sortation scheme. Each mailpiece is read and a unique identifier and first metadata are established for each mailpiece to be sorted on the first sorter. The first batch of mailpieces is sorted on the first sorter in accordance with the first sort scheme. A subset of mailpieces of the first batch is sorted to the at least one designated sortation bin. During sorting of the second batch of mailpieces on the second sorter, the subset of mailpieces, transferred to the second sorter from the at least one designated bin of the first sorter is, is sorted. Second metadata for each mailpiece of the subset is established and the second metadata is associated with the unique identifier. For each mailpiece of the subset, based on an common unique identifier, the first and second metadata are integrated to establish third metadata used to generate a non-duplicative record. A mailing report is generated and contains selected data items of the non-duplicative record for each unique identifier.

It is further desirable to provide a sorting system for sortation of mailpieces. The system includes a first and second sorter. Each sorter includes a feeder for singulating a plurality of mailpieces and feeding the singulated mailpieces into the respective sorter and a plurality of sort bins for receiving the singulated mailpieces. A reader reads mailpieces for establishing a unique identifier for each of a plurality of mailpieces. A control processor is in operable connection with each sorter. During sorting of a first batch of mailpieces on the first sorter, the control processor is configured to receive and store established unique identifiers and first metadata from at least each mailpiece of a subset of mailpieces to be transferred to the second sorter. During sorting of the subset of mailpieces transferred to the second sorter, the control processor is configured to receive and store the established unique identifiers and second metadata from at least the subset of mailpieces. For each mail piece of the subset, based on a common unique identifier, the first and second metadata are integrated to establish third metadata used to generate a non-duplicative record. A mailing report is generated and contains selected data items of the non-duplicative record for each unique identifier.

It is yet further desirable to provide a method for performing continuous sortation of mailpieces using a plurality of sorters. The method includes assigning first and second sortation schemes to first and second sorters, respectively, with the first sorter receiving a first batch of mailpieces and the second sorter receiving a second batch of mailpieces. At least one sortation bin on the first sorter is designated to receive mailpieces to be further processed on the second sorter with the second sortation scheme. Each mailpiece is read and a unique identifier and first metadata are established for each mailpiece to be sorted on the first sorter. The first batch of mailpieces is sorted on the first sorter in accordance with the first sort scheme, wherein a subset of mailpieces of the first batch is sorted to the at least one designated sortation bin. A processing flag is set within the first metadata for each mailpiece of the subset. The subset of mailpieces transferred to the second sorter is identified to ensure that a second processing flag is set within second metadata during sortation on the second sorter. During sorting of the second batch of mailpieces on the second sorter, the subset of mailpieces transferred to the second sorter from the at least one designated bin of the first sorter, is sorted. The second metadata is established for each mailpiece of the subset and the second metadata is associated with the unique identifier. Each mailpiece of the subset has the second processing flag set within the second metadata. For each mailpiece of the subset having a first and second processing flag and a common unique identifier, the first and second metadata are integrated to establish third metadata used to generate a non-duplicative record. A mailing report is generated and contains selected data items of the non-duplicative record for each unique identifier.

The advantages and novel features are set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations described herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
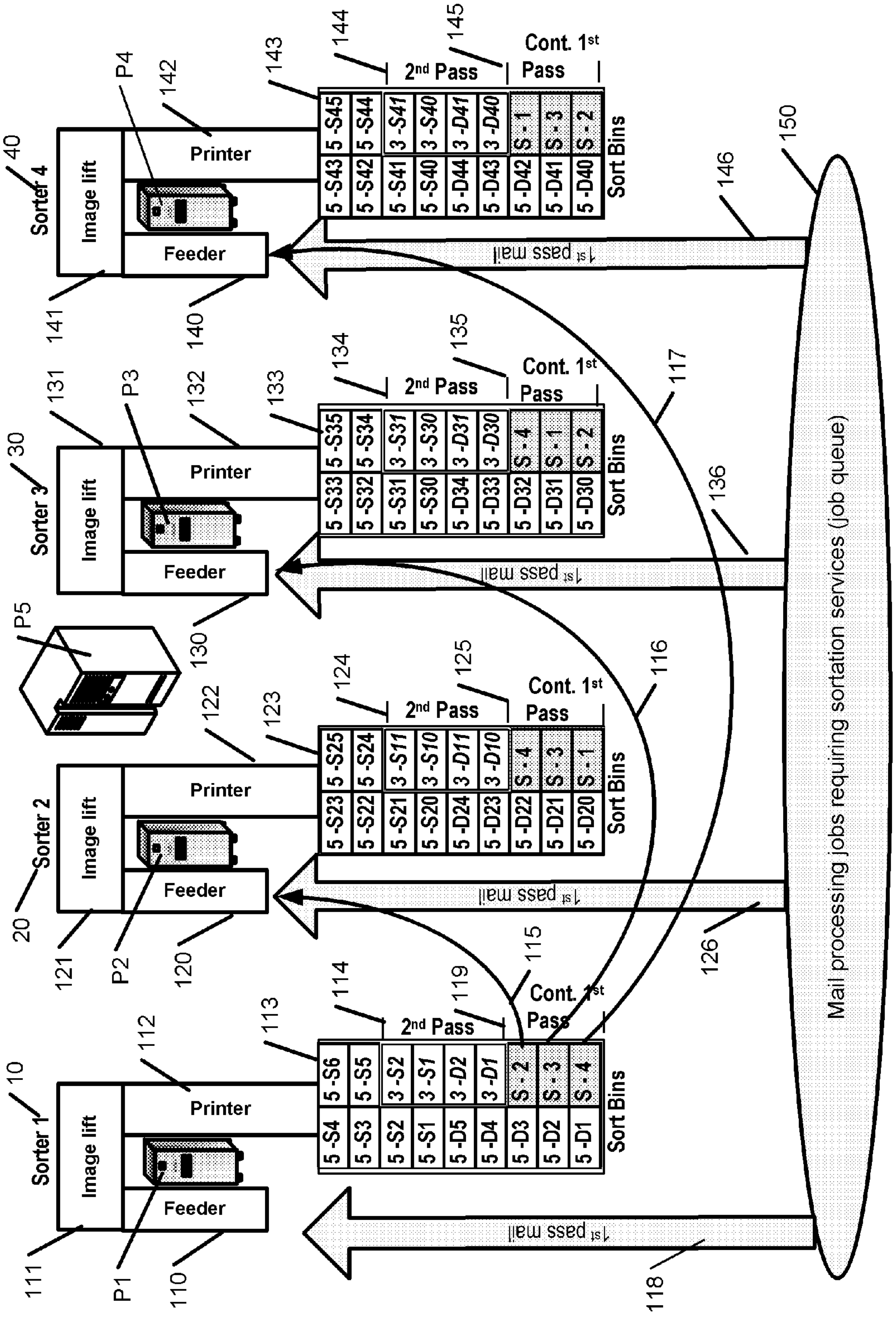
FIG. 1 illustrates a depiction of a multiple sorter environment.

Reference now is made in detail to the examples illustrated in the accompanying drawings and discussed below. FIG. 1 illustrates a sorting operation that uses 4 sorters 10, 20, 30, 40 to perform first pass sortation. Each sorter 10, 20, 30, 40 has a feeder 110, 120, 130, 140 to singulate stacks of mail into single pieces and feed the singulated mailpieces into the sorter. The sorters have an imaging system 111, 121, 131, 141 to read the address and determine the 11 digit delivery point ZIP Code, plus a printer 112, 122, 132, 142 for printing the postal authority approved barcode. Each sorter is controlled by one or more computers P1, P2, P3, P4 that perform address lookup, barcode generation and sorting control. Those skilled in the art can identify numerous other functions within a sorter that are computer controlled. Each sorter computer P1, P2, P3, P4 is connected to a central processor/server P5 that collects first pass data and generates consolidated reports for the clients, departments and postal authority. Each sorter has a varying number of sort bins 113, 123, 133, 143 that are used for sortation to the first pass sort scheme. There is no requirement for all the sorters to have the same number of bins as shown in FIG. 1. The first pass sort scheme is adjusted to match the number of bins available. Referring to the first sorter 10, there are 18 bins available. Historical analysis for past operations has shown that 5 sort bins, 5-D1 through 5-D5, have been allocated to 5 digit single numbers (i.e. 60090; 60092; 60093, etc.) and six bins have been allocated to 5 digit schemes (i.e. 70034 to 70040; 70055 to 70070; 81529 to 81530 etc.). The second pass bins 114 are similarly allocated with 3 digit single numbers (3-D1, 3-D2) and 3 digit schemes (3-S1 and 3-S2). The second pass sort groups do not necessarily conform to postal authority rules, but are organized to facilitate second pass sorting. Additional sort bins, S-2, S-3, S-4, are allocated to collect mailpieces to be run on another sorter running first pass. The entire first pass sort scheme is associated with the sorter bin. For example, bin S-2 for the first sorter 10 has all of the sort groups shown for the sort bins 123 on the second sorter 20, excluding the continuous first pass bins 125. Several bins may be assigned to a sorter bin S-2 to ensure the operator can keep the mail swept without allowing any bin to fill and stopping the sorter. Similarly, bin S-3 for sorter 10 has all of the sort groups shown for the sort bins 133 on the third sorter 30, excluding the continuous first pass bins 135 and bin S-4 for first sorter 10 has all of the sort groups shown for the sort bins 143 on the fourth sorter 40, excluding the continuous first pass bins 145. Other bins (not shown) may be allocated for collection of other mailpieces classified as rejects, out of scheme, undeliverable, etc.

The sort bin allocation process is repeated for sort bins 123, 133, 143 on sorters 20, 30 and 40. The bin assignments for sort groups are not repeated in order to have the maximum number of bins available for qualifying sort groups.

During first pass operation, jobs 118, 126, 136, 146 are selected from the job queue 150 and run on their respective sorters until all jobs are completed for first pass. During first pass operation, mailpieces 115 for second sorter 20 are collected in sort bin S-2 on first sorter 10. These mailpieces are transferred to sorter 20 on an as required basis. Individual bundles of mailpieces, trays of mailpieces or containers of trays will be transferred to sorter 20 based on operational considerations. These trays of continuous first pass mail 115 can be run at any time during first pass operation on sorter 20 without operator intervention, even during a job run. Alternately, the operator may identify that a tray(s) of mail to be run is part of a continuous first pass group of mailpieces to aid in the mailpiece tracking process and postal authority generation. Mail collected in bins S-3 and S-4 are transferred (directional arrows 116, 117) and run in a similar manner on sorters 30 and 40, respectively.

FIG. 1 illustrates 4 sorters running continuous first pass. This is for illustrative purposes only since those skilled in the art may extend the number of sorters to any desired quantity. In some instances, a given sorter may have processed all of the jobs that are suitable for the current sort scheme. In this case, a new first pass sort scheme can be allocated to this sorter and the continuous first pass designated bins can be adjusted accordingly. The reuse of sorters needs to be planned in advance to ensure that the continuous first pass sort bins are correctly allocated and the central processor/server P5 can ensure data integrity and ensure that there is no continuous first pass mail that can not be processed due to a sort scheme change over.

Figure 2:
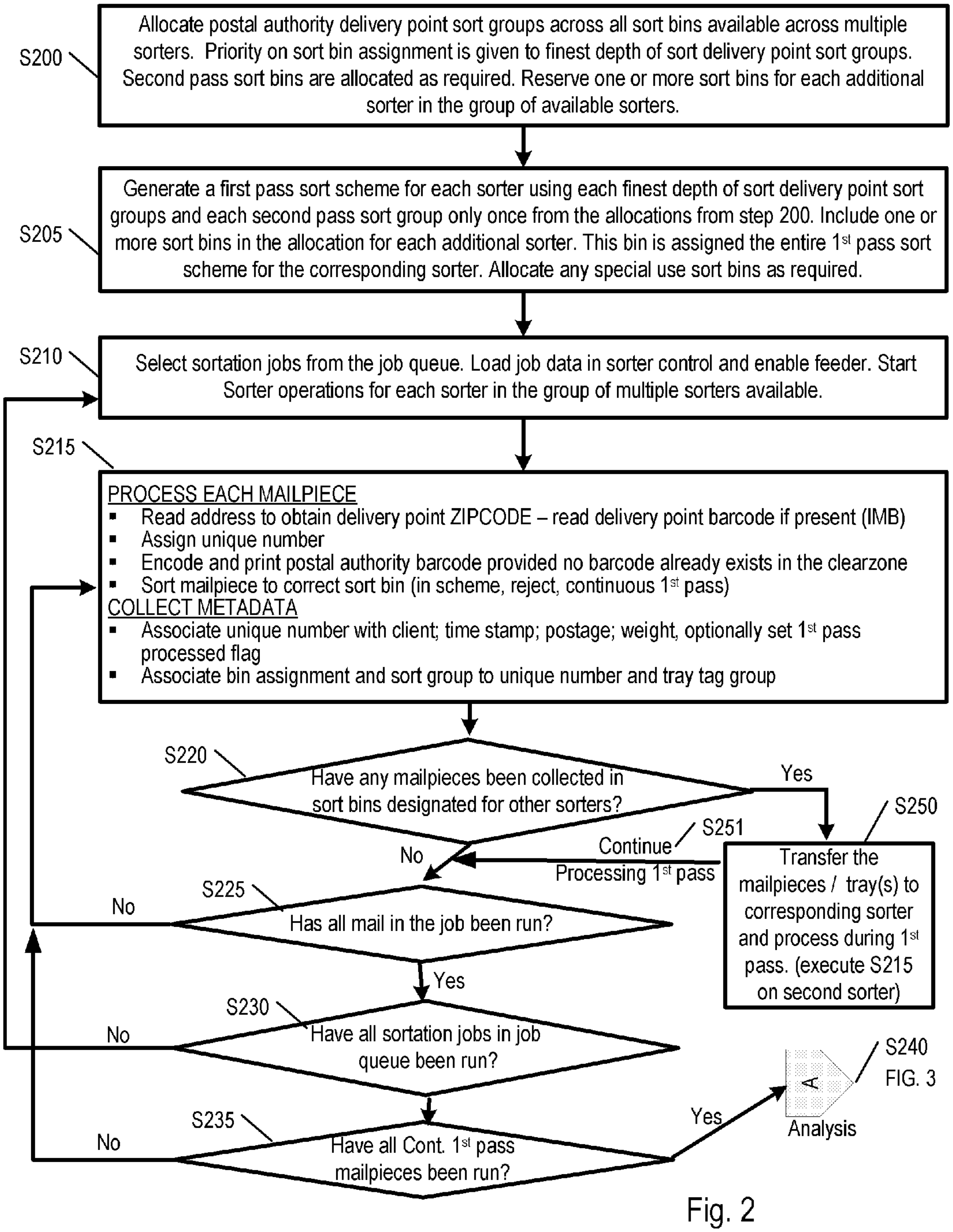
FIG. 2 is an exemplary flow chart of the functions which occur during sorting operations.

A review of the processing steps shown in FIG. 2 is now described. Before sorting operations can begin, the data needed for first pass sort scheme creation needs to be generated. This data is used to match the total number of bins available and the historical data on the sort group mail volumes (step S200). As described above for FIG. 1, 5 digit, 3 digit and AADC sort groups are allocated to the sort bins for each sorter that is available. Priority is given to bin assignments based on the high mail volume sort groups that offer the largest postage discount. Second pass bins are allocated as required and bins are reserved for continuous first pass operation. The result is the allocation of postal authority delivery point sort groups across all sort bins available, across multiple sorters. Priority on sort bin assignment is given to finest depth of sort delivery point sort groups. Second pass sort bins are allocated as required. One or more sort bins are reserved for each additional sorter in the group of available sorters.

The sort schemes are generated in step S205 from the data acquired in step S200. A first pass sort scheme is generated for each sorter using each finest depth of sort delivery point sort group and each second pass sort group only once. One or more sort bins are included in the allocation for each additional sorter. This bin is assigned the entire first pass sort scheme for the corresponding sorter. Any special use sort bin is allocated as required. The completed first pass sort schemes are loaded into the respective sorter from the processor/server P5. A sorting job is selected from the job queue 150 and appropriate metadata is loaded into the sorter control. The metadata will be associated with each mailpiece that is sorted during sortation if client or department data needs to be tracked. If the operation will be treated as a single large mailing, less metadata is utilized. Operation is then commenced for each sorter at the conclusion of step S210. If the mail make up (groups of ZIP Codes) of the available jobs is known for a specific job, the job can be directed to the sorter 10, 20, 30, 40 that has the best match of ZIP Code groups in the sorter's first pass sort scheme. This allocation will minimize the amount of mail that gets sorted to continuous first pass sort bins 119, 125, 135, 145.

Figure 3:
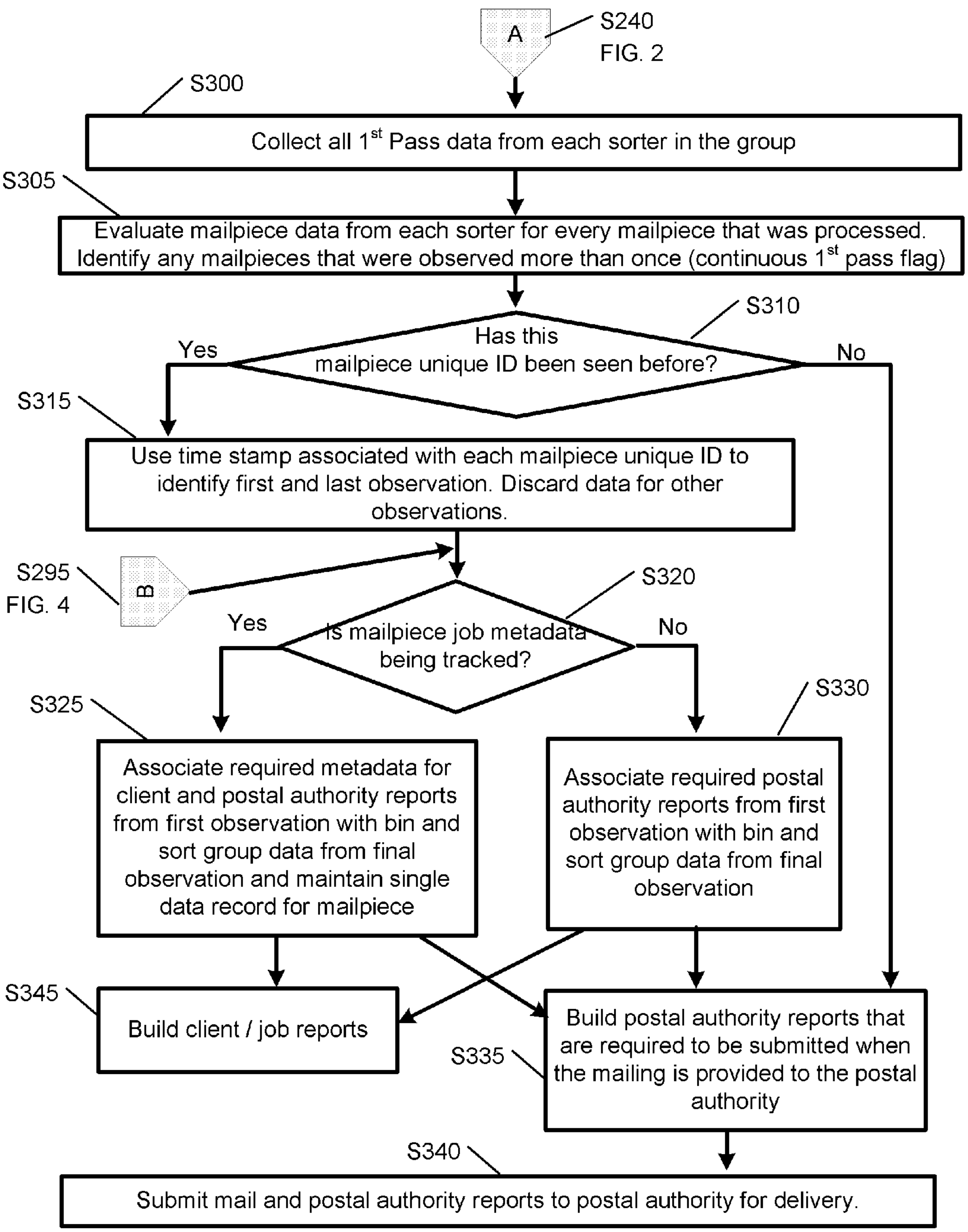
FIG. 3 is an exemplary flow chart of the data analysis functions.

During operation of the sorter, step S215, each mailpiece is processed in succession. The address is read with an imaging system to determine the 11 digit delivery point ZIP Code. The reader will read any postal authority barcode such as the Intelligent Mail Barcode (IMB) either in the address block or in the postal authority clear zone. If a barcode is detected in the clear zone, no additional barcode may be printed. This represents either an error, a continuous first pass mailpiece, or a mailpiece from another site. These situations may be corrected in data during report generation (FIG. 3). Every mailpiece with a printed IMB will have a unique number associated with it. This unique number is generated by the management module that ensures that the number is unique for a postal authority defined period. The number is either 6 or 9 digits in length. In addition to the delivery point and unique number, the Mailer Identification (MID), service type and barcode ID are needed to encode the IMB for printing in the clear zone if the a barcode is not already printed in the clear zone. The latter three data pieces are entered by the operator or downloaded from the server P5. If a unique identifier is already on the mailpiece, this unique identifier may be used in place of a unique identifier established by the management module. Finally the mailpiece is sorted into the correct sort bin based on the first pass sort scheme.

Metadata associated with the job and mailpiece is collected and correlated with the unique identifier. The unique identifier for the mailpiece is usually made up of the MID, service type and unique number, but the delivery point can be used in addition for extended uniqueness of the IMB (mailpiece license plate). Other formats for a unique identifier may be designed by those skilled in the art in place of the IMB such as, but not limited to, data matrix barcodes and additional coding formats for 4 state barcodes. The metadata saved per mailpiece and associated with the unique identifier may include, but is not limited to, client/department, time stamp when sorted, sorter ID, postage affixed, weight, bin assignment, sort group and associated tray tags. If the mailpiece is sorted to a continuous first pass sort bin, a processing flag may be set to identify the mailpiece as a continuous first pass piece. The processing flag will be used to improve processing time during analysis in the server P5. If there is a IMB in the clear zone, it will be read and decoded to obtain the unique identifier. Metadata associated with this observation will be associated with this unique identifier. The metadata can include, but is not limited to, bin assignment, time stamp, sort group and tray label group.

During operation sort bins S-1, S-2, and S-3 are monitored for any continuous first pass mailpieces that need transfer to another sorter for processing during first pass on that sorter (step S220). If such mailpiece(s) are detected, arrangements are made to transfer the mailpiece(s) to the appropriate sorter (step S250). Continuous first pass processing continues in step S251. If the job is not complete (step S225), processing continues with step S215. If the job is complete, the job queue is checked for additional jobs available (step S230). If jobs are available, processing returns to step S210. The final check, step S235, is made to be sure that all continuous first pass mail has been run. If mail needs to be run, step S215 is repeated and, if not, first pass is exited and analysis is performed (step S240).

Referring to FIG. 3, analysis begins by collecting all of the first pass run time data from each sorter 10, 20, 30, 40 into the server P5 (step S300). Every mailpiece data record that was run or rerun during first pass is analyzed to determine if the same unique identifier (unique ID) has been seen more than once (step S305). The unique identifier may be as defined for the IMB (service type, MID, unique number) or may include the delivery point ZIP Code. Other formats may be introduced by those skilled in the art. If the mailpiece unique identifier has been processed only once (step S310) the metadata is transferred to step S335 for postal authority report generation, such as the postage summary report and the mail qualification report. If the unique ID has been observed more than once (step S310), the time stamp is evaluated to identify the metadata associated with the first and last observation of the mailpiece (step S315). There are two general modes of operation where client/department data is tracked for each job and those operations where all the jobs are combined to form one large job. If job data is not being tracked for the mailpiece (step S320) then data from the first observation must be combined with data associated with the final observation (step 330), since mailpiece tracking requires that the final sort group, bin designation and tray label group (virtual tray group) be reported with the postal authority documentation. Additional observations beyond a first and last are error conditions. The metadata form these observations may be discarded, except in cases where detailed item tracking is required. Postal authority documentation is generally provided in electronic format (step S335). When client/department reports are required (step S325), additional metadata is required from the first observation. Metadata will be aggregated based on client/department from both observations and report generated for the client/department (step S345). Data required for the postal authority reports is transferred for processing by step S335. The final step (step S340) is to transfer the mail and reports to the postal authority and to build and transfer client/job data (step S345).

Figure 4:
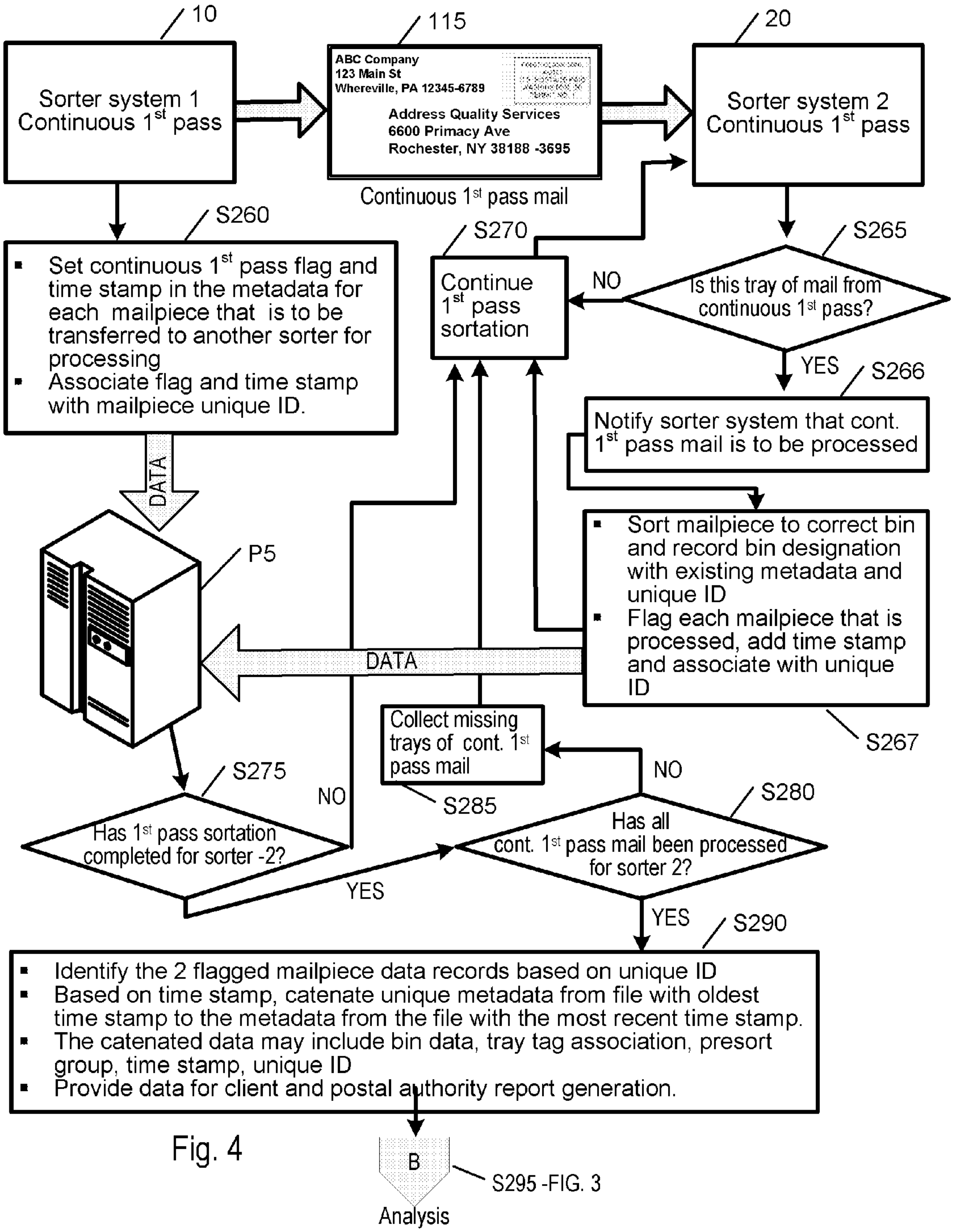
FIG. 4 is an exemplary flow chart of the processing sequence for sorter operations and data collection and data processing using a processing flag.

FIG. 4 is an alternative process flow that makes use of a continuous first pass process flag in the mailpiece metadata to improve data processing efficiency associated with identifying the multiple observations of the same unique identifier. The identification of continuous first pass mailpieces is restricted to only processing those mailpieces that have the continuous first pass processing flag set versus analyzing all of the mailpiece data records to identify the continuous first pass mailpiece records. The continuous first pass processing flag also may contain an indicator identifying which of the plurality of first pass sorters the subset of mailpieces originated from. Those skilled in the art will combine features of FIGS. 2, 3 and 4 in various configurations to accomplish the continuous first pass sortation process. Reference is made to FIG. 4 for an exemplary flow chart of the processing sequence for sorter operations and data collection and data processing using a continuous first pass processing flag. The exemplary flow is from the perspective of the second sorter 20 processing both first pass mail and continuous first pass mail during continuous processing.

The process steps of FIG. 4 are repeated for each sorter that is allocated to continuous first pass operation. First sorter 10 processes a job and sorts continuous first pass mailpieces 115 to bin S-2. The other mailpieces are sorted to different bins based on the sort scheme for sorter 10. The mailpieces from the S-2 are trayed and transferred to sorter 20. In step S260, the sorter 10 processor P1 sets the continuous first pass processing flag in the metadata for each mailpiece that is sorted for continuous first pass bin 119 and transfers the proceeding data along with the unique identifier to the server P5. The data transfer is done either on a mailpiece by mailpiece basis or in batches. All the data must be at the server P5 before analysis can be performed to create reports.

Sorter 20 is processing first pass mail when a continuous first pass tray of mail (a subset of the total mail that is sorted on first pass) becomes available for sorting (step S265). The operator must enter data into the control processor P2 or scan a special tray label before sorting the tray of mail (step S266). The mail pieces are sorted to the correct bin and the bin designation, continuous first pass processing flag, time stamp and unique identifier are sent to the server P5 individually or in batches as part of the metadata associated with each mailpiece (step S267). Continuous first pass sortation is continued S270 until all the jobs are processed for sorter 20. The server system P5 is constantly monitoring the status for the multi sorter processing. Depending on the operational plan for preparing the mail for delivery to the postal authority, the mailing may be based on the mail from all the sorters as one mailing or the mail may be broken down into other subsets such as, but not limited to, a mailing for each sorter. The server P5 monitors the available jobs 150 to determine if any additional jobs can be run on sorter 20 (step S275). If jobs are available, first pass processing continues (step S270). If all jobs are completed for sorter 20, a determination must be made if any continuous first pass mail is not yet processed that was destined for sortation on sorter 20 (step S280). If continuous first pass mail still needs sortation, the mail trays must be collected (step S285) and processed (step S270).

If all mail processing is complete, data processing and analysis is performed (step S290). The mailpieces whose metadata has the first pass processing flag set are grouped by an identical unique identifier. There should be only two entries for a mailpiece if the continuous first pass sortation has been done correctly. If additional entries are present, the errors are resolved though additional processing such as, but not limited to, saving the first and last observation data and discarding all intermediate data based on the time stamp. This approach would be appropriate if a continuous first pass tray was run on the wrong sorter. Based on the time stamp and unique identifier, data from the first observation and the last observation is catenated to one metadata file for the mailpiece. The may include, but not limited to, client, job, bin data, tray label group association, presort group, time stamp and unique ID. The parameters included are those needed for client and postal authority reports. The processing is completed starting with step S295 (FIG. 3).

While the various examples pertain primarily to a sorter or multi-sorter environment primarily, those skilled in the art will recognize that any document processing environment may take advantage of the aforementioned techniques, including mail preparation or inserter-based environments. Furthermore, it will be recognized by skilled artisans that the techniques and concepts described herein relate to functions of document processing environments, including pre-sort bureaus, shared mailing networks, captive shops, inbound or outbound sorting environments and the like.

Although the discussion above has focused largely on the methodologies of sorter or multi-sorters, those skilled in the art will recognize that those methodologies may be controlled or implemented by one or more processors/controllers, such as one or more computers (P1, P2, P3 and P4 in FIG. 1) or servers (P5). Typically, each such processor/controller is implemented by one or more programmable data processing devices. The hardware elements operating systems and programming languages of such devices are conventional in nature, and it is presumed that those skilled in the art are adequately familiar therewith.

Figure 5:
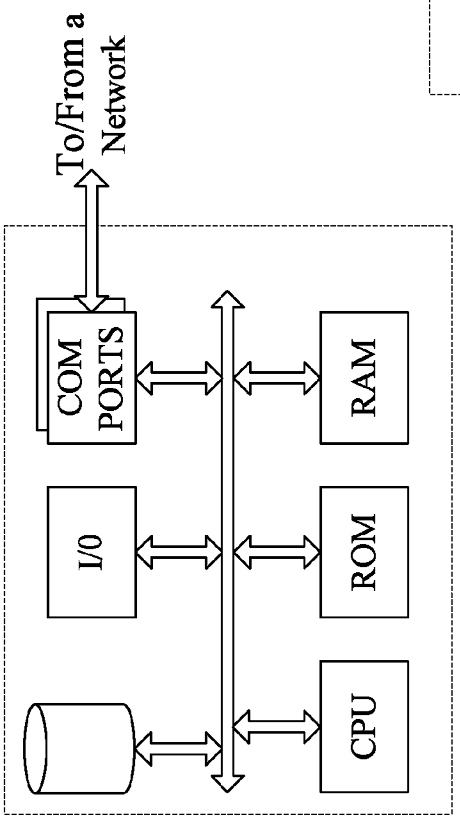
FIG. 5 illustrates a network or host computer platform, as may typically be used to implement a server.
Figure 6:
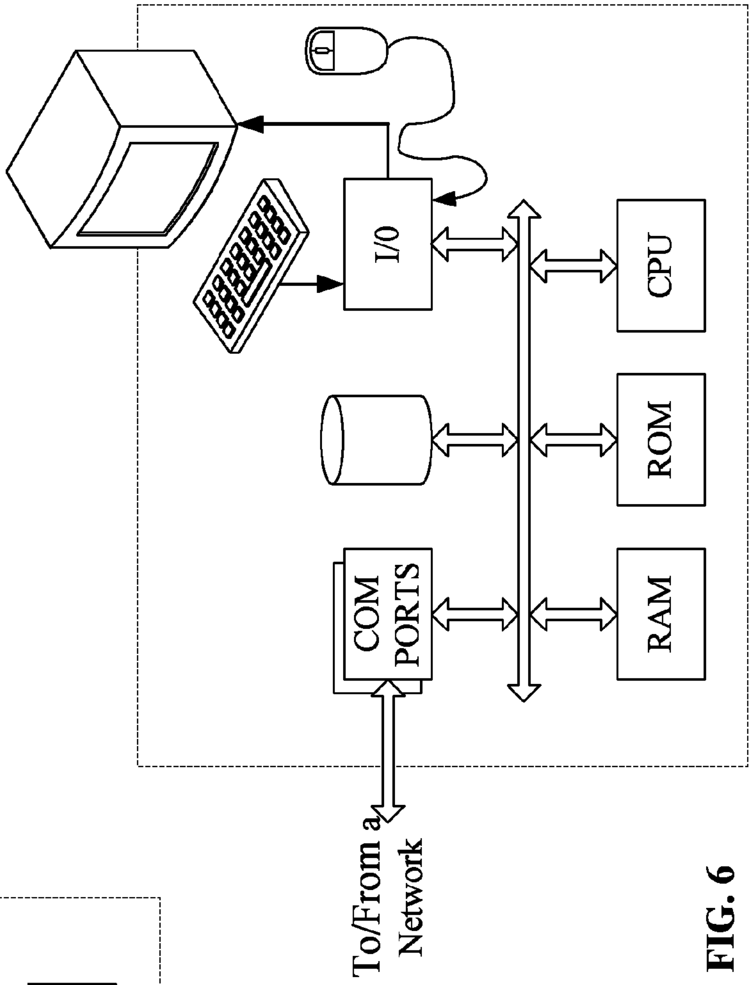
FIG. 6 depicts a computer with user interface elements.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and, as a result, the drawings should be self-explanatory. Such systems typically contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM, or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software as well as data, such as sort scheme instructions. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems/devices associated with the sorting environment. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer in a document factory may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for processing document data as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art.

Hence aspects of the techniques discussed herein encompass hardware and programmed equipment for controlling the relevant document processing as well as software programming, for controlling the relevant functions. A software or program product, which may be referred to as an "article of manufacture" may take the form of code or executable instructions for causing a computer or other programmable equipment to perform the relevant data processing steps, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the sorting control. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

In the detailed description above, numerous specific details are set forth by way of examples in order to provide a thorough understanding of the relevant teachings. However, it should be apparent to those skilled in the art that the present teachings may be practiced without such details. In other instances, well known methods, procedures, components, and software have been described at a relatively high-level, without detail, in order to avoid unnecessarily obscuring aspects of the present teachings.

What is claimed:

1. A method for performing continuous sortation of mailpieces using a plurality of sorters, the method comprising steps of:

assigning first and second sortation schemes to first and second sorters, respectively, the first sorter to receive a first batch of mailpieces and the second sorter to receive a second batch of mailpieces;

designating at least one sortation bin on the first sorter to receive mailpieces to be further processed on the second sorter with the second sortation scheme;

reading each mailpiece and establishing a unique identifier and first metadata for each mailpiece to be sorted on the first sorter;

sorting the first batch of mailpieces on the first sorter in accordance with the first sort scheme, wherein a subset of mailpieces of the first batch is sorted to the at least one designated sortation bin;

during sorting of the second batch of mailpieces on the second sorter, sorting the subset of mailpieces transferred to the second sorter from the at least one designated bin of the first sorter;

for each mailpiece of the subset, establishing second metadata and associating the second metadata with the unique identifier;

for each mailpiece of the subset, based on an common unique identifier, integrating the first and second metadata to establish third metadata used to generate a non-duplicative record; and generation a mailing report, the mailing report containing selected data items of the non-duplicative record for each unique identifier.

2. The method according to claim 1, wherein the reading step includes:

reading an address on a respective mailpiece to obtain a delivery point zip code for the mailpiece; and encoding at least the delivery point zip code and unique identifier for printing of a postal authority approved barcode.

3. The method according to claim 2, further comprising the step of:

printing the postal authority approved barcode on the respective mailpiece.

4. The method according to claim 1, wherein the reading step includes:

reading a postal authority approved barcode from a respective mailpiece and associating the barcode with the associated unique identifier.

5. The method according to claim 1, wherein the mailing report comprises a postal authority report and/or a client report.

6. The method according to claim 1, wherein the first, second and third metadata, with a common unique identifier is selected from one or more of the following: client information, sortation time stamp, sorter identification, postage affixed, mailpiece weight, sortation bin assignment, sortation group, and associated tray label.

7. The method according to claim 1, wherein the step of sorting the transferred mailpieces includes:

sorting the transferred mailpieces during sorting of the second mail batch of mailpieces in accordance with the second sortation scheme.

8. The method according to claim 1, further comprising the steps of:

assigning third and fourth sortation schemes to third and fourth sorters, respectively, the third sorter to receive a third batch of mailpieces and the fourth sorter to receive a fourth batch of mailpieces;

designating at least two additional sortation bins on the first sorter to receive second and third subsets of mailpieces to be further processed on the third and fourth sorters with the third and fourth sortation schemes, respectively.

9. The method according to claim 8, further comprising the steps of:

sorting the first batch of mailpieces on the first sorter in accordance with the first sort scheme, wherein a second and third subset of the first batch is sorted to the at least one designated sortation bin;

during sorting of the third and fourth batches of mailpieces on the third and fourth sorters, respectively, sorting the second and third subsets of mailpieces transferred to the third and fourth sorters from the first sorter;

for each mailpiece of the second and third subsets, establishing fourth and fifth metadata, respectively, and associating the fourth and fifth metadata with the unique identifier of each mailpiece of the second and third subsets, respectively;

for each mailpiece of the second subset, integrating the first and third metadata to establish sixth metadata used to generate a non-duplicative record;

for each mailpiece of the third subset, integrating the first and fourth metadata to establish seventh metadata used to generate a non-duplicative record; and generation the mailing report, the mailing report containing a non-duplicative record for each unique identifier.

10. A computer system programmed to implement the method of claim 1.

11. A software product comprising executable instructions for programming at least one computer to implement the method of claim 1, and a machine-readable medium bearing the instructions.

12. A sorting system for sortation of mailpieces, the system comprising:

a first and second sorter, each sorter comprising:

a feeder for singulating a plurality of mailpieces and feeding the singulated mailpieces into the respective sorter;

a plurality of sort bins for receiving the singulated mailpieces;

a reader for reading mailpieces for establishing a unique identifier for each of a plurality of mailpieces;

a control processor in operable connection with each sorter, the control processor configured to perform steps of:

during or after sorting of a first batch of mailpieces on the first sorter, receiving and storing established unique identifiers and first metadata from at least each mailpiece of a subset of mailpieces to be transferred to the second sorter;

during or after sorting of the subset of mailpieces transferred to the second sorter, receiving and storing the established unique identifiers and second metadata from at least the subset of mailpieces;

for each mail piece of the subset, based on a common unique identifier, integrating the first and second metadata to establish third metadata used to generate a non-duplicative record; and generation a mailing report, the mailing report containing selected data items of the non-duplicative record for each unique identifier.

13. The system according to claim 12, wherein the first and second metadata is selected from one or more of the following: client information, sortation time stamp, sorter identification, postage affixed, mailpiece weight, sortation bin assignment, sortation group, and associated tray label.

14. The system according to claim 12, further comprising:

a sorter computer for the first and second sorters, each sorter computer in operable connection with the control processor.

15. The system according to claim 12, further comprising:

a third and fourth sorter, the third and fourth sorter configured to receive transferred mailpieces from the first sorter, wherein the first sorter further comprises at least two additional designated sortation bins, one for each of the third and further sorters.

16. The system according to claim 12, further comprising:

a printer for printing a postal authority approved barcode on mailpieces.

17. A method for performing continuous sortation of mailpieces using a plurality of sorters, the method comprising steps of:

assigning first and second sortation schemes to first and second sorters, respectively, the first sorter to receive a first batch of mailpieces and the second sorter to receive a second batch of mailpieces;

designating at least one sortation bin on the first sorter to receive mailpieces to be further processed on the second sorter with the second sortation scheme;

reading each mailpiece and establishing a unique identifier and first metadata for each mailpiece to be sorted on the first sorter;

sorting the first batch of mailpieces on the first sorter in accordance with the first sort scheme, wherein a subset of mailpieces of the first batch is sorted to the at least one designated sortation bin;

for each mailpiece of the subset, setting a processing flag within the first metadata;

identifying the subset of mailpieces transferred to the second sorter to ensure that a second processing flag is set within second metadata during sortation on the second sorter;

during sorting of the second batch of mailpieces on the second sorter, sorting the subset of mailpieces transferred to the second sorter from the at least one designated bin of the first sorter;

for each mailpiece of the subset, establishing the second metadata and associating the second metadata with the unique identifier, each mailpiece of the subset having the second processing flag set within the second metadata;

for each mailpiece of the subset having a first and second processing flag and a common unique identifier, integrating the first and second metadata to establish third metadata used to generate a non-duplicative record; and generation a mailing report, the mailing report containing selected data items of the non-duplicative record for each unique identifier.

18. The method according to claim 17, wherein the reading step includes:

reading an address on a respective mailpiece to obtain a delivery point zip code for the mailpiece; and encoding at least the delivery point zip code and unique identifier for printing of a postal authority approved barcode.

19. The method according to claim 18, further comprising the step of:

printing the postal authority approved barcode on the respective mailpiece.

20. The method according to claim 17, wherein the reading step includes:

reading a postal authority approved barcode from a respective mailpiece and associating the barcode with the associated unique identifier.

21. The method according to claim 17, wherein the first, second and third metadata is selected from one or more of the following: client information, sortation time stamp, sorter identification, postage affixed, mailpiece weight, sortation bin assignment, sortation group, and associated tray label.

22. A computer system programmed to implement the method of claim 17.

23. A software product comprising executable instructions for programming at least one computer to implement the method of claim 17, and a machine-readable medium bearing the instructions.

* * * * *